(12) United States Patent
Kurihara et al.

(10) Patent No.: US 11,104,165 B2
(45) Date of Patent: Aug. 31, 2021

(54) SUPPORT SERVICE SYSTEM FOR INKJET PRINTING APPARATUS AND CONTROL METHOD THEREFOR

(71) Applicant: Hitachi Industrial Equipment Systems Co., Ltd., Tokyo (JP)

(72) Inventors: Hiroko Kurihara, Tokyo (JP); Takashi Kawano, Tokyo (JP); Nobuhiro Harada, Tokyo (JP); Kenjiro Fujii, Tokyo (JP); Tomohisa Kohiyama, Tokyo (JP); Makiko Naemura, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 334 days.

(21) Appl. No.: 16/089,086

(22) PCT Filed: Mar. 29, 2016

(86) PCT No.: PCT/JP2016/059995
§ 371 (c)(1),
(2) Date: Sep. 27, 2018

(87) PCT Pub. No.: WO2017/168536
PCT Pub. Date: Oct. 5, 2017

(65) Prior Publication Data
US 2020/0298601 A1   Sep. 24, 2020

(51) Int. Cl.
*B41J 29/393* (2006.01)
*G06F 3/12* (2006.01)

(52) U.S. Cl.
CPC .......... *B41J 29/393* (2013.01); *G06F 3/1288* (2013.01)

(58) Field of Classification Search
CPC .................................................. B41J 29/393
See application file for complete search history.

(56) References Cited

U.S. PATENT DOCUMENTS 7,975,049 B2   7/2011   Nishikawa et al.
2009/0094091 A1   4/2009   Thieret et al.
(Continued)

FOREIGN PATENT DOCUMENTS

JP   2005-44037 A   2/2005
JP   2006-99300 A   4/2006
(Continued)

OTHER PUBLICATIONS

International Search Report (PCT/ISA/210) issued in PCT Application No. PCT/JP2016/059995 dated Jul. 5, 2016 with English translation (four (4) pages).
(Continued)

*Primary Examiner* — Scott A Richmond
(74) *Attorney, Agent, or Firm* — Crowell & Moring LLP

(57) ABSTRACT

Previously, a customer may not have known which information was acquired and may have felt anxiety. In addition, only internal data of the apparatus was previously acquired. However, in order to determine a trouble in the inkjet printer with high precision, visual information such as a state of a printer mechanism or a conveyance line and a print result is also necessary to determine the apparatus state. Therefore, it is necessary to establish a maintenance system capable of acquiring such information. Disclosed is a support service system for an inkjet printing apparatus, including: a first network terminal that can communicate information regarding a state of a first inkjet printing apparatus through communication from a first external communication device installed in the first inkjet printing apparatus; and a second network terminal that performs determination on the basis of the information regarding the state obtained through communication of the first network terminal and transmits a result of the determination to the first network terminal, wherein the first network terminal transmits a maintenance
(Continued)

request for the first inkjet printing apparatus to the second network terminal, and the second network terminal transmits whether or not responding to the maintenance request to the first network terminal.

12 Claims, 7 Drawing Sheets

(56) References Cited

U.S. PATENT DOCUMENTS

| | | | |
|---|---|---|---|
| 2009/0274342 A1* | 11/2009 | Wu | G03G 15/0848 |
| | | | 382/112 |
| 2015/0138588 A1* | 5/2015 | Matsuzaki | H04N 1/00 |
| | | | 358/1.14 |
| 2016/0088166 A1* | 3/2016 | Fukushima | H04N 1/00015 |
| | | | 358/1.15 |

FOREIGN PATENT DOCUMENTS

| | | |
|---|---|---|
| JP | 2007-81573 A | 3/2007 |
| JP | 2012-59123 A | 3/2012 |
| JP | 2013-976 A | 1/2013 |

OTHER PUBLICATIONS

Japanese-language Written Opinion (PCT/ISA/237) issued in PCT Application No. PCT/JP2016/059995 dated Jul. 5, 2016 (five (5) pages).

Extended European Search Report issued in counterpart European Application No. 16896756.0 dated Oct. 10. 2019 with English translation (seven (7) pages).

* cited by examiner

F I G. 1
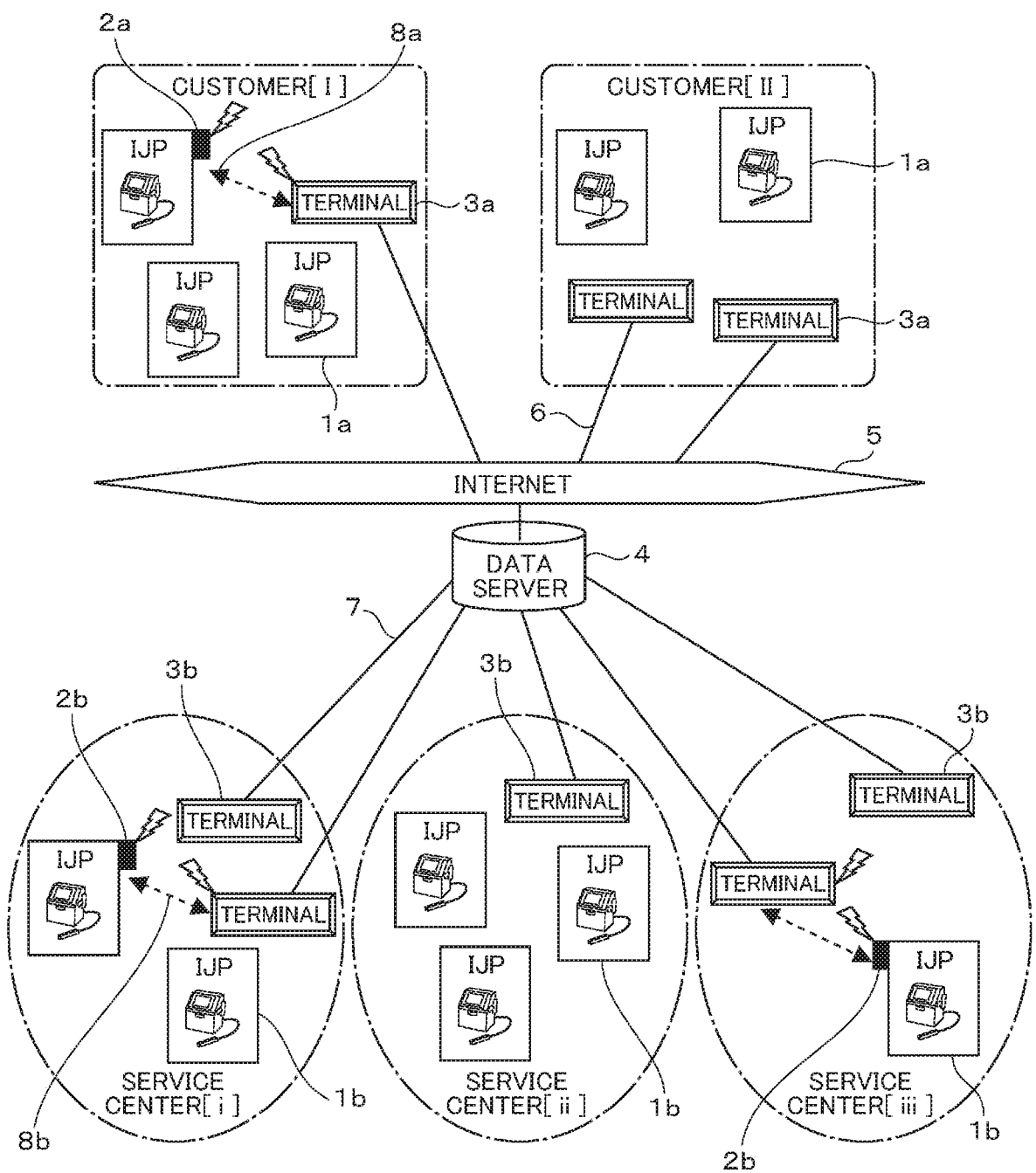

SUPPORT SERVICE SYSTEM FOR INKJET PRINTING APPARATUS AND CONTROL METHOD THEREFOR

TECHNICAL FIELD

The present invention relates to a support service system for an inkjet printing apparatus and a control method therefor.

BACKGROUND ART

As a background art of the technical field belonging to this invention, JP 2012-59123 A (Patent Document 1) is known in the art. In Patent Document 1, it is stated that "as a maintenance application starts by connecting a maintenance USB memory 40 to a printer control device 22, a communication line is connected between the printer control device 22 and the maintenance device 30, and the maintenance device 30 performs diagnosis for the inkjet printer 21".

CITATION LIST

Patent Document

Patent Document 1: JP 2012-59123 A

SUMMARY OF THE INVENTION

Problems to be Solved by the Invention

Patent Document 1 discusses a maintenance system for an inkjet printer. However, a customer who uses the maintenance system of Patent Document 1 may not know which information is acquired and may feel anxiety. In addition, in the technique of Patent Document 1, only internal data of the apparatus is acquired. However, in order to determine a trouble in the inkjet printer with high precision, visual information such as a state of a printer mechanism or a conveyance line and a print result is also necessary to determine the apparatus state. Therefore, it is necessary to establish a maintenance system capable of acquiring such information.

In this regard, the present invention provides a service system for an inkjet printing apparatus using a state of a print mechanism or a conveyance line or the like.

Solutions to Problems

In order to address the aforementioned problems, for example, configurations described in claims are employed.

This application includes a plurality of means for solving the problems. For example, there is provided a support service system for an inkjet printing apparatus, including: a first network terminal that can communicate information regarding a state of a first inkjet printing apparatus through communication from a first external communication device installed in the first inkjet printing apparatus; and a second network terminal that performs determination on the basis of the information regarding the state obtained through communication of the first network terminal and transmits a result of the determination to the first network terminal, wherein the first network terminal transmits a maintenance request for the first inkjet printing apparatus to the second network terminal, and the second network terminal transmits whether or not responding to the maintenance request to the first network terminal.

Effects of the Invention

According to the present invention, it is possible to provide a support service system for an inkjet printing apparatus and a control method therefor capable of implementing high-precision maintenance.

Other problems, configurations, and effects will become apparent by the following detailed description of the embodiments.

BRIEF DESCRIPTION OF THE DRAWINGS

FIG. 1 is a configuration example of a network that executes a maintenance support service of an inkjet printing apparatus according to the present invention.

MODE FOR CARRYING OUT THE INVENTION

Figure 2:
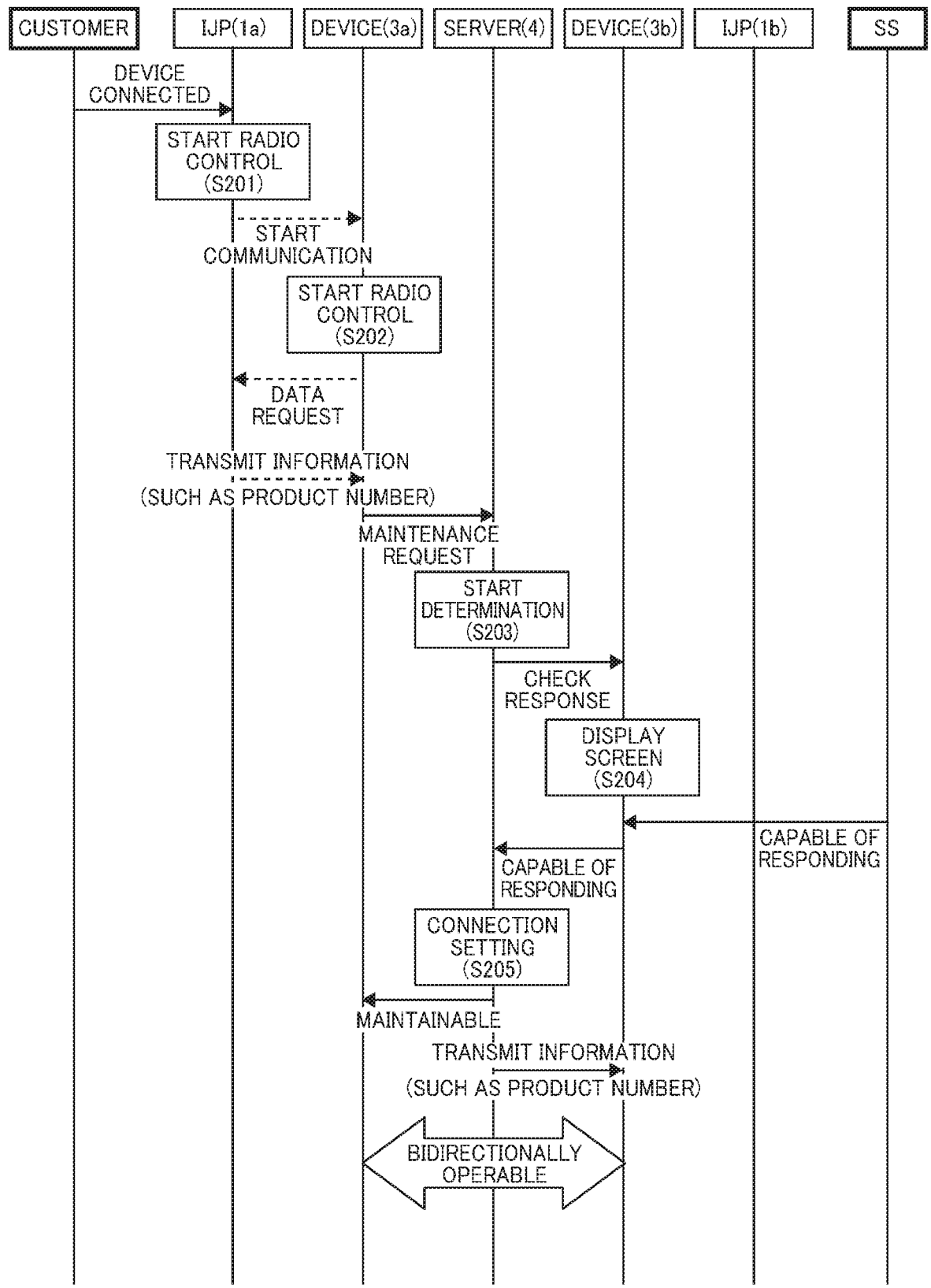
FIG. 2 is a sequence chart when a service center is capable of responding in the service system of the inkjet printing apparatus according to the present invention.

In recent years, as awareness of traceability is improved, it became common throughout the world to specify information such as a production date and a production factory on the product. A charge control type inkjet printing apparatus is employed as means for performing this specification in some cases.

Advantageously, the charge control type inkjet can print without a contact with printed matter. However, since the print mechanism comes into contact with the air at all times, it is easily affected by the external air. For this reason, in order to stably operate the inkjet printing apparatus, the customer performs daily maintenance such as cleaning of the print mechanism in many cases. However, when a trouble occurs in the apparatus, the customer contacts a manufacturer service center and requests a maintenance service to solve the trouble. In this case, the maintenance service engineer of the service center responds by listening on a phone call or visits the customer factory to visually check the state of the print mechanism of the apparatus to solve the trouble.

However, in the case of the phone call, the engineer may not easily obtain sufficient information necessary for the troubleshooting from the telephone meeting with the customer or may not visually check the state of the print mechanism. Even when the engineer visits the customer factory, it is difficult to immediately respond to a trouble in a customer factory distant from the service center. In addition, when a trouble occurs in the midnight or during an off-day of the service center, it is difficult to solve the trouble until the service center is opened. In any case, when it is difficult to immediately solve a trouble of the apparatus, a production line of the customer factory stops in the meantime, and this may cause a significant loss in the production activity of the customer.

For this reason, when a trouble occurs in the customer apparatus, it is demanded to establish a system which rapidly and accurately acquires information necessary to solve the trouble, such as apparatus data or a state of the print mechanism without visiting to the customer factory or a system capable of responding even during an off-day of the service center.

The present invention proposes a remote maintenance support service capable of reducing a downtime of the customer apparatus in the case of an abnormality occurring in the inkjet printing apparatus of the customer by obtaining apparatus state from a communication environment in which radio communication and the Internet communication are combined, allowing a maintenance service engineer to determine details of the abnormality in the customer apparatus on the basis of the apparatus state and advice an optimum recovery method.

A communication sequence or a communication content will be described in details below in Example 1. Shortly, the remote maintenance support service according to present invention is configured by combining at least one of "an inkjet printing apparatus installed with a connection terminal of an external communication device", "a detachable external communication device for implementing radio communication with an installation destination apparatus", "a network terminal having a video camera function and capable of radio communication and Internet communication", and "a data server capable of Internet communication and used by the service center to store customer information, a troubleshooting database, information on maintenance service engineers, and the like".

Here, the number of the inkjet printing apparatuses, the number of the external communication devices, and the number of the network terminals are plural in both the customer side and the service center side. The inkjet printing apparatus installed with the external communication device and the network terminals are connected to each other through radio communication such as a Bluetooth (registered trademark) protocol. The network terminals of the customer side and the service center side are connected to each other by interposing a data server using the Internet communication. It is assumed that the external communication device can be freely installed or uninstalled, so that the customer installs it to the corresponding apparatus when the customer receives a remote maintenance support service. In addition, it is assumed that the network terminal includes a portable terminal such as a tablet device, a smart phone, and a notebook computer and downloads a software program dedicated to the remote maintenance support service in advance.

When a customer connects the external communication device to the inkjet printing apparatus to receive a remote maintenance support service, the data server acquires relating customer information (such as an address of the factory, language information, and a maintenance service engineer responsible for the maintenance) from the product number of the inkjet printing apparatus. On the basis of this information, maintenance service engineers suitable for the customer are listed up, and a maintenance service request for the customer is transmitted to the network terminal of the maintenance service engineer for a predetermined period of time in the listed order, so that matching between the customer and the service center (maintenance service engineer) is performed. If the service center replies as "capable of responding", the data server establishes communication connection between the customer and the service center. If the service center replies as "not capable of responding", or there is no reply for a predetermined period of time, the process advances to the next service center, and the same process is performed until the communication connection is established. If no communication connection is established with any service center, a reply "not capable of responding" is replied to the network terminal of the customer, and the remote maintenance support service is automatically terminated. Note that, since the establishment of the communication connection is executed through the Internet, the communication can be established even when the customer and the service center are located in different nations.

The service center acquires internal data of the customer's apparatus and an abnormality state of the apparatus through the network terminal after establishment of the communication connection. In addition, the service center receives visual information such as states of the print mechanism or the conveyance line or a print result as video data through the network terminal by instructing the customer, performs a listening survey with the customer regarding the apparatus state, or acquires a condition for generating the same abnormality in the past or a recovery method from the database of the data server. The service center comprehensively determines such information and proposes an optimum recovery method to the customer. The proposal may be performed by instructing the recovery method to the network terminal of the customer or by remotely controlling the inkjet printing apparatus of the customer by manipulating the inkjet printing apparatus of the service center. In addition, the recovery method may be determined by the service center solely or may be determined by the data server automatically.

Then, the customer performs the recovery method proposed by the service center and determines whether or not the abnormality is removed. If the abnormality is removed, this fact is replied to the network terminal. If the abnormality is not removed, this fact is replied to the network terminal, and a maintenance service reservation is performed as necessary. In the maintenance service reservation, a customer selects a suitable date and time from available dates stored in data server and input by the service center responsible for the customer in advance to make an advanced reservation. As a result, it is possible to smoothly manage a maintenance service engineer's visit to the customer. In addition, a reply of the result of the recovery method is fed back to the database of the data server, and the result is utilized in the subsequent remote maintenance support services.

This remote maintenance support service may be utilized when a query for the apparatus operation is received from the customer as well as when an abnormality occurs.

A software program dedicated to the remote maintenance support service may be configured to download such that an updated version is available at all times when the communication connection is established or the like. In addition, a screen presentation may include an automatic language translation function in order to provide a service even when the language is different between the customer and the service center.

Using the aforementioned remote maintenance support service, it is possible to facilitate service improvement and reduce a downtime of the customer's apparatus.

It is possible to provide a remote maintenance support service of the inkjet printing apparatus even for a customer located distant from the service center in real time without a delay by employing the present invention in the maintenance support.

As a result, from the viewpoint of the customer, (1) it is possible to reduce a downtime of an apparatus and thus minimize influence on a production system when the apparatus suffers from an abnormality. In addition, (2) it is possible to reduce a visiting cost of the maintenance service engineer and thus suppress the service cost.

Meanwhile, from the viewpoint of the service center, (1) it is possible to reduce a visiting time from the service center and thus improve a service response. In addition, (2) it is possible to respond to a site different from the customer factory and thus implement a hospitable support.

Example 1

Examples will now be described with reference to the accompanying drawings.

FIG. 1 illustrates a configuration example of the network for executing a maintenance support service for the inkjet printing apparatus according to the present invention.

Each factory of the customer has a detachable external communication device 2a for implementing radio communication with an installation destination device, an inkjet printing apparatus 1a in which the connection terminal of the external communication device 2a is installed, and a network terminal 3a capable of operating a video camera function, a radio communication function, and an Internet communication function.

Each service center has a detachable external communication device 2b for implementing radio communication with an installation destination apparatus, an inkjet printing apparatus 1b in which the connection terminal of the external communication device 2b is installed, and a network terminal 3b capable of operating the video camera function, the radio communication function, and the Internet communication function.

Each of the service centers further has a single data server 4 capable of Internet communication for storing customer information available for the service center, a troubleshooting database, information on maintenance service engineers, and the like. The data server 4 and the network terminals 3a of each customer are connected to each other using the Internet communication 6 through the Internet 5. In addition, the data server 4 and the network terminal 3b of the service center are connected to each other through LAN communication 7 using the Internet communication protocol.

In the customer factory, the inkjet printing apparatus 1a is installed with a connection terminal for connecting the external communication device 2a. As the external communication device 2a is installed in the connection terminal, radio communication 8a is executed between the network terminals 3a using a radio communication protocol such as the Bluetooth. Similarly, in the service center, as the external communication device 2b is installed in the connection terminal of the inkjet printing apparatus 1b, radio communication 8b is executed between the network terminals 3b using a radio communication protocol such as the Bluetooth.

Figure 3:
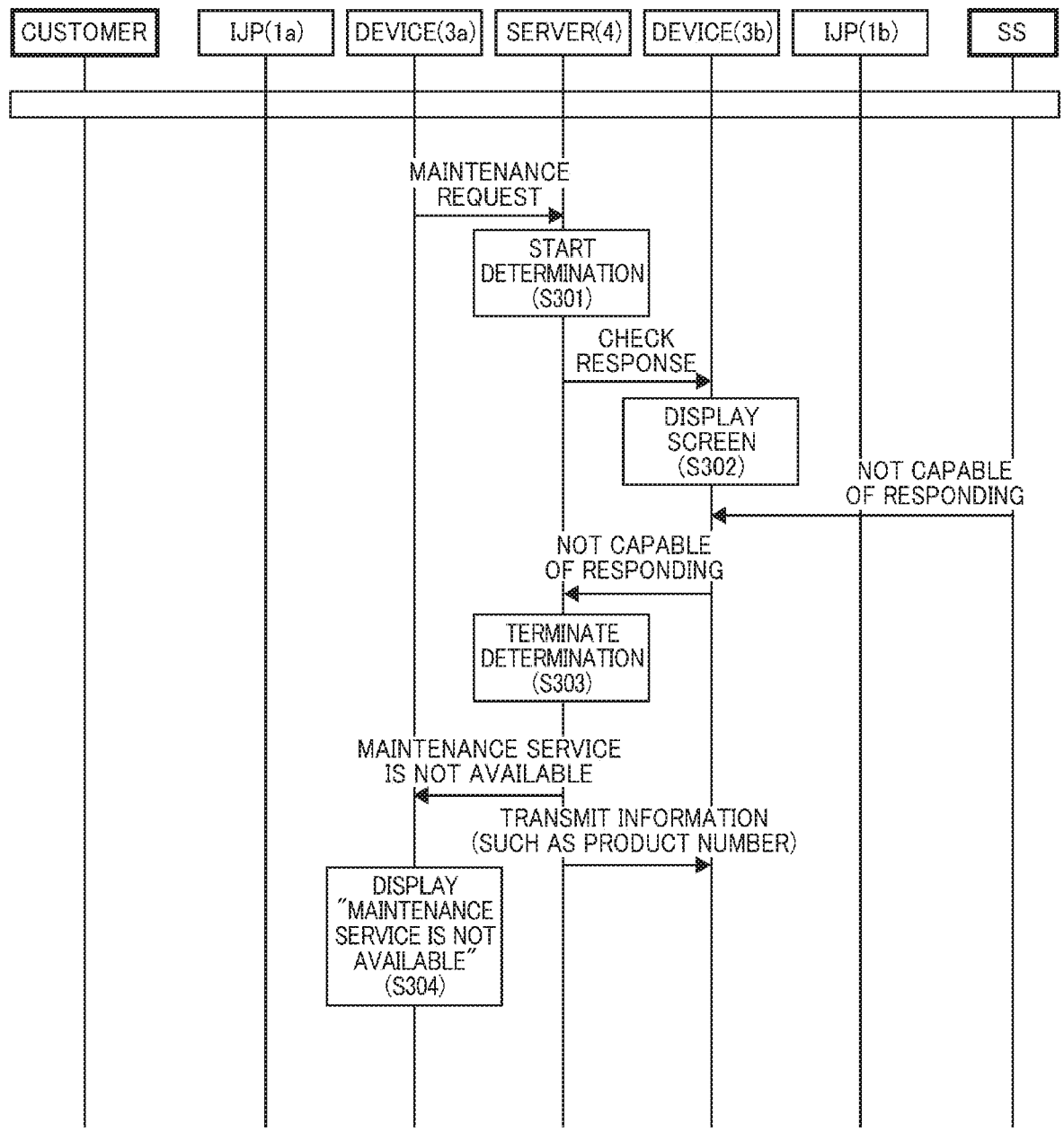
FIG. 3 is a sequence chart when the service center is not capable of responding in the service system of the inkjet printing apparatus according to the present invention.

FIG. 2 is a sequence chart when a service center is capable of responding in a service system of the inkjet printing apparatus according to the present invention. FIG. 3 is a sequence chart when a service center is not capable of responding in a service system of the inkjet printing apparatus according to the present invention. In this case, an aspect until a service center responsible for a customer is determined will be described by assuming that a trouble occurs in the inkjet printing apparatus of the customer.

In the customer side, the external communication device 2a is installed in the inkjet printing apparatus 1a. The control unit of the inkjet printing apparatus monitors an input terminal state at all times. As the external communication device 2a is installed, a specific radio communication protocol for which a program is selected in advance is activated, so that radio communication starts for the network terminal 3a of the customer (S201).

The network terminal 3a of the customer monitors a radio communication state at all times and starts radio control as radio communication is received from the inkjet printing apparatus 1a (S202). Specifically, apparatus information or data such as the product number of the inkjet printer 1a is requested and acquired through the radio communication, and a maintenance service request signal is transmitted to the data server 4.

The data server 4 starts determination as the maintenance service request signal is received (S203). Specifically, positional information of the network terminal 3a of the customer is specified, and the states of the connected network terminals 3b of all the service centers are acquired. Then, a maintenance service request signal is transmitted for a predetermined period of time to a network terminal 3b of the service center that is currently operating and is closest on the basis of the positional information of the customer.

The network terminal 3b of the service center side displays a message "THERE IS A MAINTENANCE SERVICE REQUEST" on the screen for a predetermined period of time (S204). The service center checks this displayed content and replies to the data server 4 regarding whether or not the service center can respond to provide a maintenance service.

Here, if it is replied that the service center can respond, the network terminal 3b of the service center and the network terminal 3a of the customer side are connected to each other through the data server 4 and the Internet communication to share data (S205).

If it is replied that the service center is not capable of responding, or if there is no reply for a predetermined period of time, the data server 4 performs similar communication with the network terminal 3b of the next closest service center that is currently operating. This process is repeated until a maintenance service engineer who can respond is found.

If a maintenance service engineer who can respond is not found to the end, and it is difficult to provide a maintenance service, the sequence of FIG. 3 is executed.

Steps S301 or S302 of FIG. 3 are similar to steps S203 and S204, respectively, of FIG. 2, and they will not be described. If any one of network terminals 3b of the service centers is not capable of responding, the data server 4 determines that the determination is terminated (S303), so that a message "MAINTENANCE SERVICE IS NOT AVAILABLE" is displayed on the network terminal 3a of the customer, and the process is terminated (S304).

In this case, the maintenance service request signal is transmitted for a predetermined period of time to the network terminal 3b of the service center in order of the closest distance on the basis of the positional information of the customer. Alternatively, the network terminal that transmits the maintenance service request signal may be determined on the basis of other references. For example, the maintenance service request signal may be transmitted by giving a priority to a network terminal capable of communication within a shortest communication time, a network terminal that does not have a load for responding to maintenance services of other customers, or the like.

Next, an aspect after the maintenance service for responding to a trouble in the inkjet printing apparatus of the customer side is determined in FIG. 2 will be described with reference to FIGS. 4 to 7.

Figure 4:
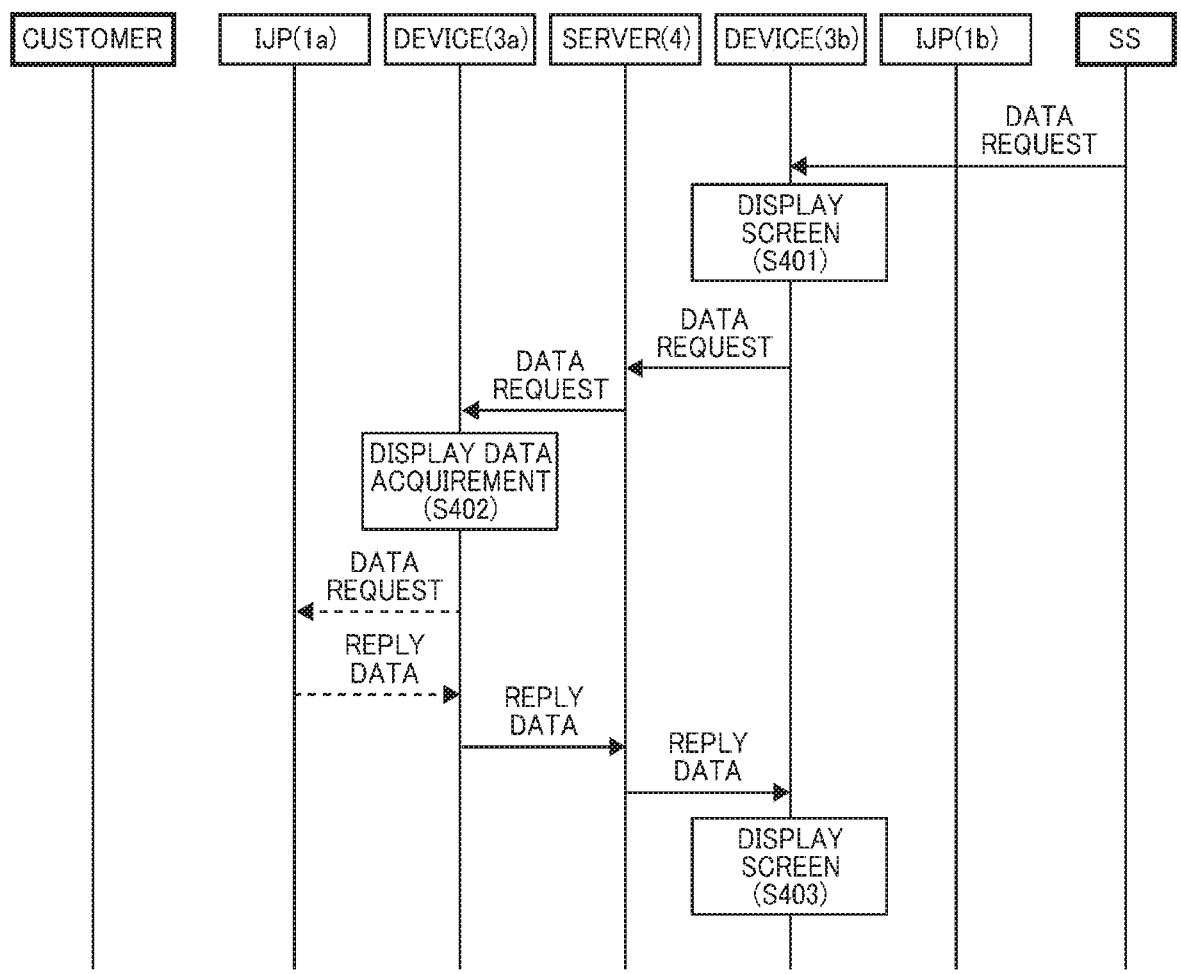
FIG. 4 is a sequence chart when a data request is performed in the service system of the inkjet printing apparatus according to the present invention.
Figure 5:
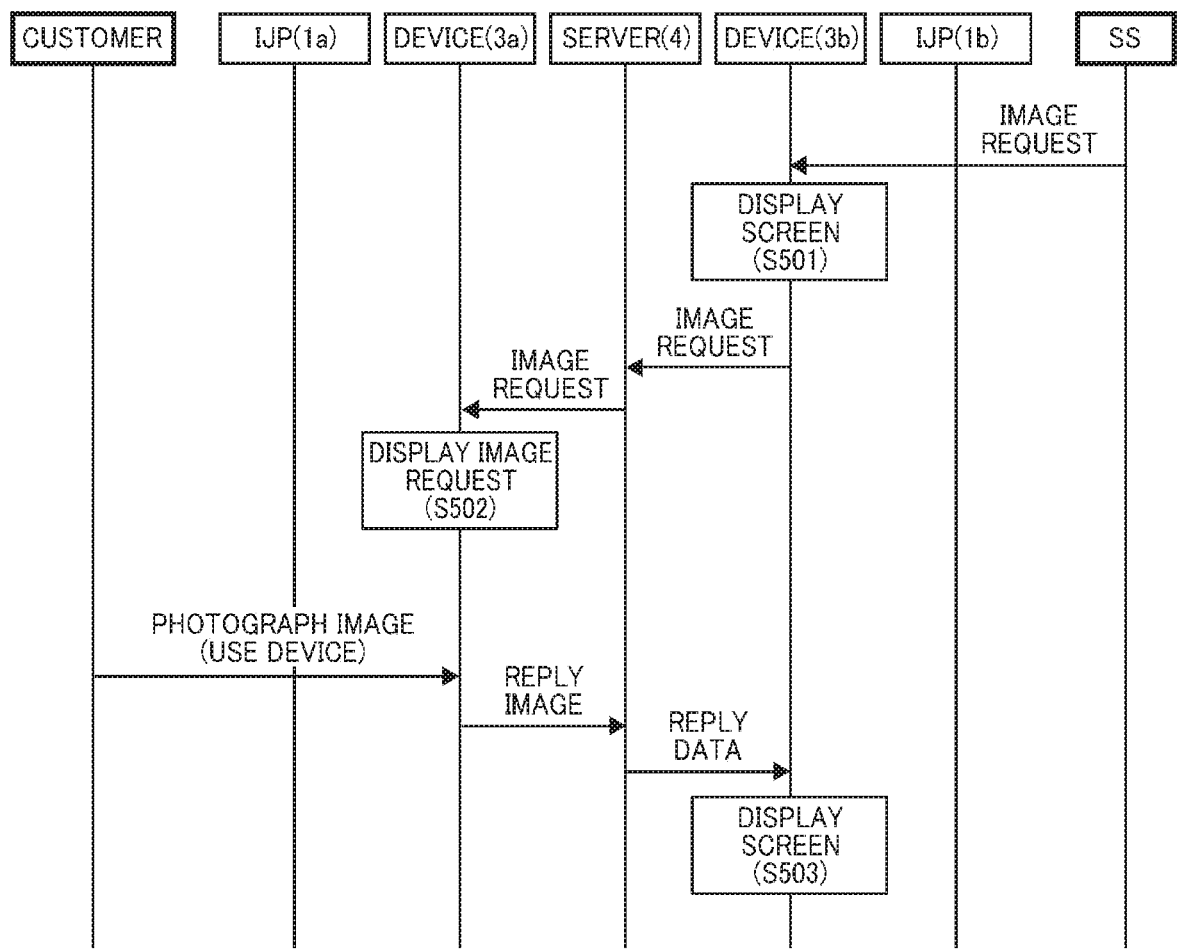
FIG. 5 is a sequence chart when an image request is performed in the service system of the inkjet printing apparatus according to the present invention.
Figure 6:
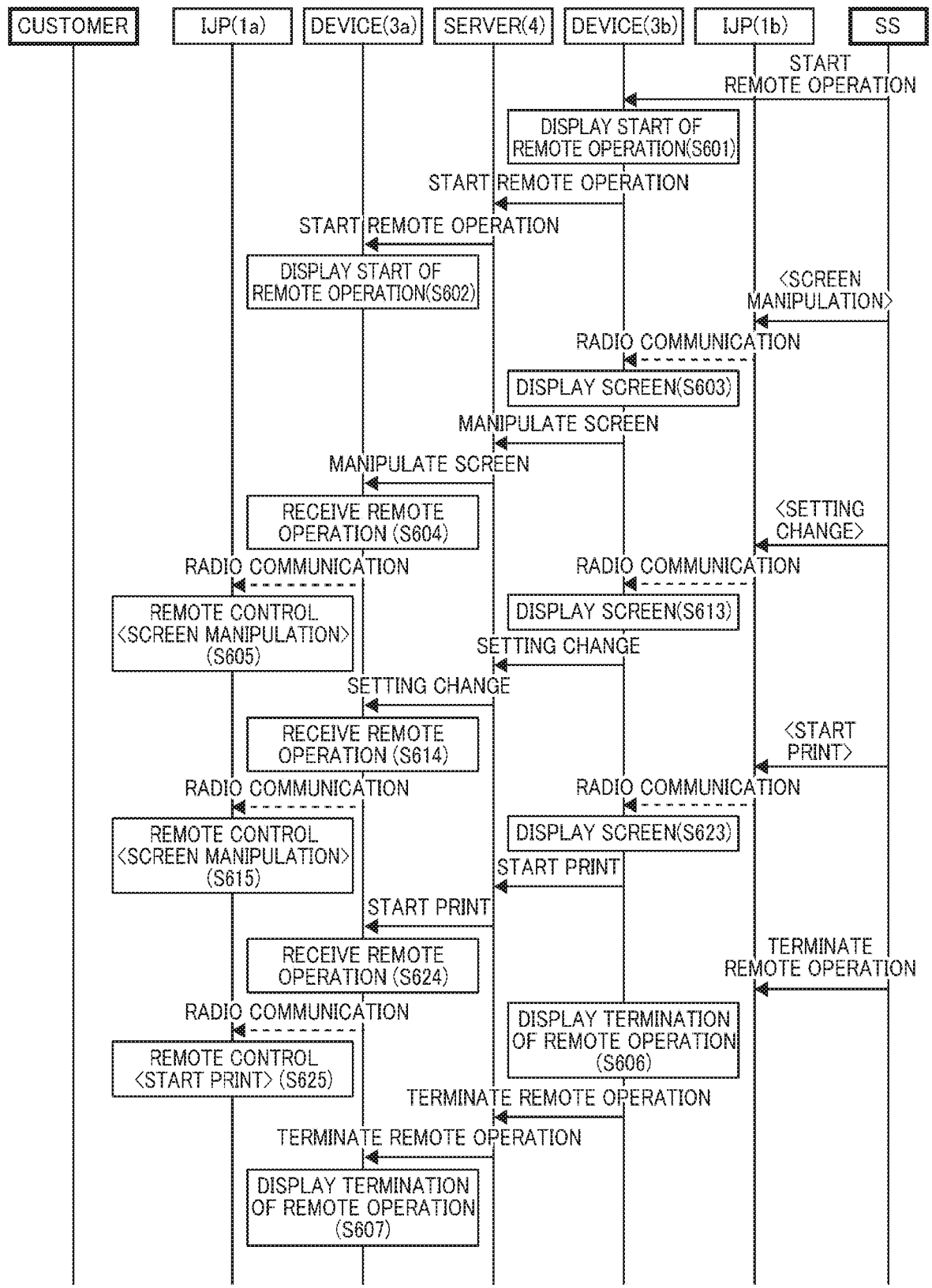
FIG. 6 is a sequence chart when a remote control is performed in the service system of the inkjet printing apparatus according to the present invention.
Figure 7:
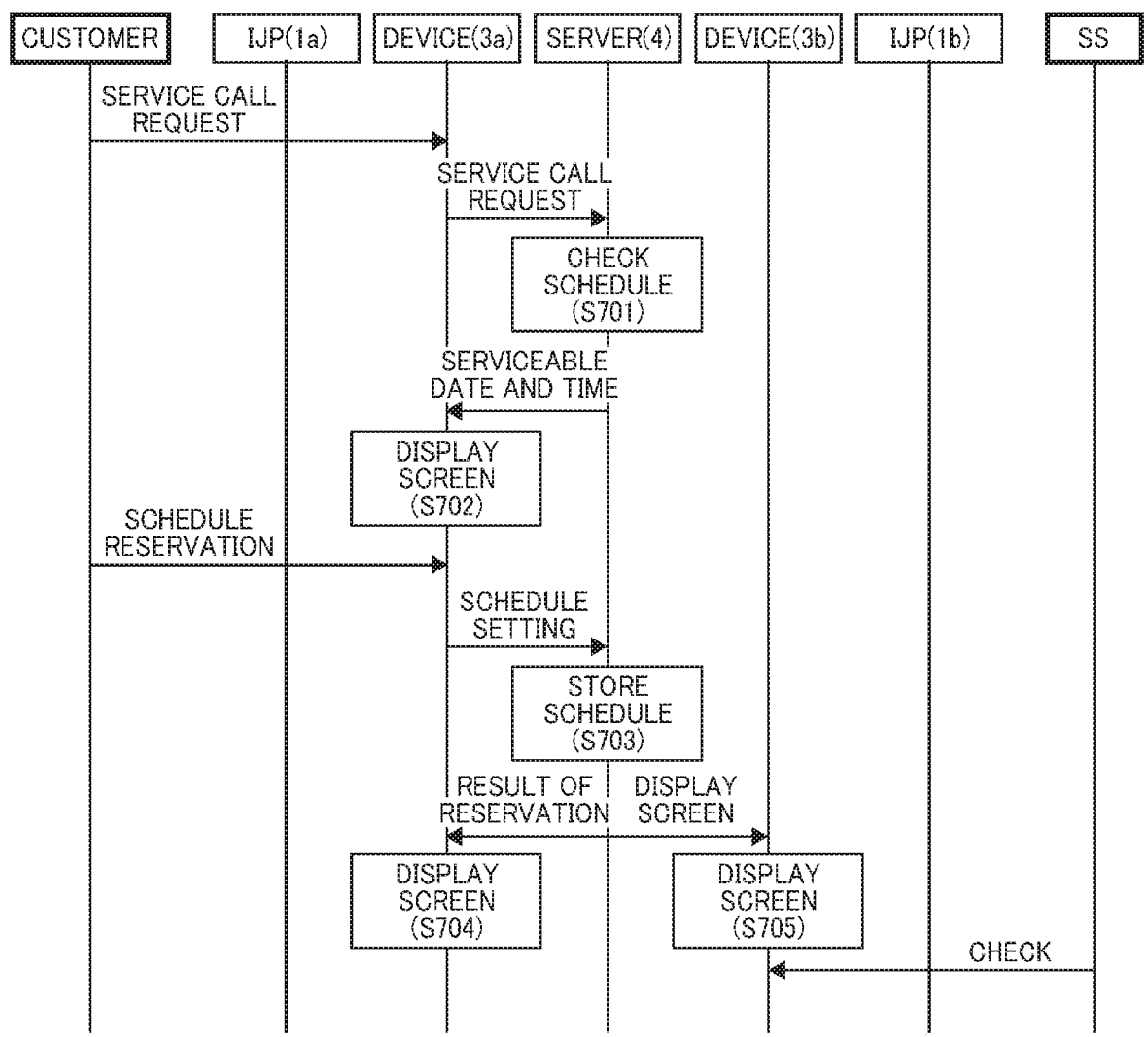
FIG. 7 is a sequence chart when a service call setting is performed in the service system of the inkjet printing apparatus according to the present invention.

FIG. 4 is a sequence chart when a data request is performed in the service system of the inkjet printing apparatus according to the present invention. FIG. 5 is a sequence chart when an image request is performed in the service system of the inkjet printing apparatus according to the present invention. FIG. 6 is a sequence chart when a remote control is performed in the service system of the inkjet printing apparatus according to the present invention. FIG. 7 is a sequence chart when a service call setting is performed in the service system of the inkjet printing apparatus according to the present invention.

In FIG. 4, if there is apparatus data on the inkjet printing apparatus of the customer side necessary for the service center, it is input to the network terminal 3b of the service center (S401). Then, a fact that the data is acquired by the network terminal 3a of the customer side through the Internet communication is displayed (S402), and the data is automatically acquired from the inkjet printing apparatus 1a of the customer side using radio communication. The acquired data is displayed on the display unit of the network terminal 3b of the service center side (S403), so that the service center can recognize it. Here, specifically, the apparatus data received by the service center side from the customer side includes information regarding a print result itself such as a character type, a character size, barcode presence, a character height, and a character width, apparatus information for performing print such as an ink type, an ink pressure, a current date and time, and a deflection voltage, information regarding the apparatus setting such as a software version, a reciprocal print setting, and a setting for connection with external communication, and the like.

Even when there is necessary information in any part other than the inkjet printing apparatus, a reply may be received from the customer side by transmitting a query from the service center side to the customer side. Specifically, the content of the reply from the customer includes use frequency of the apparatus, a method of operating the inkjet printing apparatus, a speed of the conveyance line of the customer, and the like.

In FIG. 5, if there is a state of the print mechanism or the like of the inkjet printing apparatus of the customer side necessary for the service center, it is input to and displayed on the network terminal 3b of the maintenance service engineer (S501). Then, an image request is displayed on the network terminal 3a of the customer side through the Internet communication (S502), and a photographing guide is displayed. In addition, the video camera function is automatically activated. The customer photographs a state of the print mechanism, an ink discharge state, a print result, appearance of the inkjet printing apparatus, an installation state of the inkjet printing apparatus, a state of the conveyance line of the customer, a print target of the customer, and the like using the video camera function by referring to the photographing guide. The result of the photographing is directly displayed on the network terminal 3b of the service center (S503). Therefore, the service center side can perform a maintenance advice on the basis of the displayed result.

In FIG. 6, if the service center determines that it is necessary to remotely control the inkjet printing apparatus 1a of the customer side, a message "START REMOTE CONTROL" is input to the network terminal 3b of the maintenance service engineer (S601). As the message is input, a fact that the remote control starts for the inkjet printing apparatus 1a is displayed on the display unit of the network terminal 3a of the customer side through the Internet communication (S602). At the time of the display of S602, the inkjet printing apparatus 1a of the customer side and the inkjet printing apparatus 1b of the service center are connected to each other through the network terminal 3a or 3b, the data server 4, and the Internet communication to start a "remote operation mode" in which the setting of the inkjet printing apparatus 1a is automatically and remotely changed to follow a change of the setting of the inkjet printing apparatus 1b. In order to manipulate a screen of the inkjet printing apparatus 1a during the remote operation mode, a service engineer manipulates a screen of the local inkjet printing apparatus 1b. The result of the screen manipulation is displayed on the network terminal 3b (S603) and is displayed on the network terminal 3a of the customer side through the radio communication and the network communication (S604). The network terminal 3a of the customer side performs the same screen manipulation as that of the inkjet printing apparatus 1b for the inkjet printing apparatus 1a through the radio communication (S605).

Similarly, in order to change the setting of the inkjet printing apparatus 1a during the remote operation mode, S613, S614, and S615 of FIG. 6 are performed. In order to start the print using the inkjet printing apparatus 1a, S623, S624, and S625 of FIG. 6 are performed. Such operations are similar to those of S603, S604, and S605, and they will not be described.

In order to terminate the "remote operation mode", a message "TERMINATE REMOTE OPERATION" is input to the network terminal 3b of the maintenance service engineer (S606). As this message is input, a fact that the remote operation of the inkjet printing apparatus 1a is terminated is displayed on the display unit of the network terminal 3a of the customer side through the Internet communication (S607). At the time of the display of S607, the "remote operation mode" for automatically and remotely changing the setting of the inkjet printing apparatus 1a to follow the setting change of the inkjet printing apparatus 1b is terminated.

FIG. 7 illustrates a response when a trouble is not solved through the processes of FIGS. 4 to 6, and the customer desires a service call. A serviceable schedule of the maintenance service engineers is stored in the data server in advance in order to allow the customer to freely set the serviceable date and time on the basis of the serviceable schedule when the customer desires a maintenance service. The customer asks a service call to the data server 4 through the network terminal 3a, and the data server 4 checks the serviceable schedule stored therein (S701). A result of the check of S701 is displayed on the screen of the network terminal 3a (S702), and the customer selects a desired date and time for the service call from the displayed serviceable schedule and inputs a service call reservation to the network terminal 3a. The input desired date and time is recorded in the schedule of the data server 4 through the network terminal 3a (S703), and a result of the reservation is displayed on the screen of the network terminal 3a (S704) and is also displayed on the screen of the network terminal 3b of the service center side (S705). Using this system, the service engineer who uses the network terminal 3a can check the desired service call date and time of the customer at any timing. In addition, the customer also can transmit the desired service call date and time to the service center without querying the service engineer.

A software program dedicated to a maintenance system inside a network device will be described additionally. The software program enables communication even when different languages are used between the customer and the maintenance service engineer. If the language is different, the language is translated and displayed using the software program dedicated to the maintenance system. In addition, if there is a difference from the updated version when it is activated, a version-up operation may be performed.

Through the aforementioned processes, it is possible to provide a remote maintenance support service capable of reducing a downtime of the customer apparatus by obtaining an apparatus state of the customer side from the communication network environment in which the radio communication and the Internet communication are combined, and allowing the service center to determine details of the abnormality of the customer apparatus on the basis of the apparatus state and advice an optimum recovery method when an abnormality occurs in the inkjet printing apparatus of the customer.

REFERENCE SIGNS LIST 1a, 1b inkjet printing apparatus installed with connection terminal of external communication device
2a, 2b detachable external communication device for implementing radio communication for installation destination apparatus
3a, 3b network terminal capable of operating video camera function, radio communication, and Internet communication
4 data server capable of Internet communication and used by the service center to store customer information, a troubleshooting database, information on maintenance service engineers, and the like
5 Internet
6 Internet communication using Internet communication protocol
7 LAN communication using Internet communication protocol
8a, 8b radio communication using radio communication protocol such as Bluetooth

The invention claimed is:

1. A support service system for an inkjet printing apparatus, comprising:
a first network terminal that can communicate information regarding a state of a first inkjet printing apparatus through communication from a first external communication device installed in the first inkjet printing apparatus; and
a second network terminal that performs determination on the basis of the information regarding the state obtained through communication of the first network terminal and transmits a result of the determination to the first network terminal,
wherein the first network terminal transmits a maintenance request for the first inkjet printing apparatus to the second network terminal, and
the second network terminal transmits an indication of whether or not the second network terminal is capable of responding to the maintenance request to the first network terminal.

2. The support service system according to claim 1, wherein the second network terminal transmits a signal for requesting the first network terminal to provide additional information regarding the state of the first inkjet printing apparatus communicated from the first network terminal, and
the first network terminal transmits the additional information requested by the second network terminal.

3. The support service system according to claim 1, wherein the second network terminal transmits, to the first network function, a signal for requesting to transmit an image obtained by photographing a print mechanism of the first inkjet printing apparatus, and
the first network terminal transmits an image of the print function of the first inkjet printing apparatus to the second network terminal.

4. The support service system according to claim 1, further comprising a second inkjet printing apparatus connected to the second network terminal,
wherein the second network terminal transmits a changed operation condition to the first network terminal and reflects the changed operation condition on an operation condition of the first inkjet printing apparatus when the operation condition of the second inkjet printing apparatus is changed.

5. The support service system according to claim 1, further comprising a data server that stores information regarding an operation status of the service center,
wherein the second network terminal transmits information of the data server to the first network terminal when the first network terminal outputs a signal for requesting a service call.

6. The support service system according to claim 1, wherein, when the indication indicates that the second network terminal is not capable of responding to the maintenance request, the first network terminal transmits the maintenance request to another second network terminal.

7. A method for controlling a support service system, comprising:
a first communication process in which information regarding a state of a first inkjet printing apparatus is transmitted by a first network terminal through communication from a first external communication device installed in the first inkjet printing apparatus,
a second communication process in which determination is performed on the basis of the information regarding the state obtained through communication of the first communication process, and a result of the determination is transmitted,
wherein, in the first communication process, a maintenance request for the first inkjet printing apparatus is transmitted, and
in the second communication process, an indication of whether or not a second network terminal is capable of responding to the maintenance request is transmitted.

8. The method for controlling the support service system according to claim 7, wherein, in the second communication process, a signal for requesting additional information regarding a state of the first inkjet printing apparatus transmitted in the first communication process is transmitted, and
a third communication process in which the additional information transmitted in the second communication process is transmitted is further performed.

9. The method for controlling the support service system according to claim 7, wherein, in the second communication process, a signal for requesting to transmit an image obtained by photographing a print mechanism of the first inkjet printing apparatus is transmitted, and
a third communication process in which an image of a print function of the first inkjet printing apparatus transmitted in the second communication process is transmitted is further performed.

10. The method for controlling the support service system according to claim 7, wherein, in the second communication process, a changed operation condition is transmitted and is reflected on an operation condition of the first inkjet printing apparatus when the operation condition of the second inkjet printing apparatus of the service center is changed.

11. The method for controlling the support service system according to claim 7, wherein, in the second communication process, information of the data server that stores information regarding an operation status of a service center is transmitted when a signal for requesting a service call is transmitted in the first communication process.

12. The method for controlling the support service system according to claim 7, wherein, when the indication indicates that the second network terminal is not capable of responding to the maintenance request, the first network terminal transmits the maintenance request to another second network terminal.

* * * * *